(12) United States Patent
Piedrahita et al.

(10) Patent No.: US 9,827,518 B2
(45) Date of Patent: Nov. 28, 2017

(54) CROSSFLOW FILTRATION PARTICLE SEPARATOR

(71) Applicant: THE REGENTS OF THE UNIVERSITY OF CALIFORNIA, Oakland, CA (US)

(72) Inventors: Raul H. Piedrahita, Davis, CA (US); Tien-Chieh Hung, Davis, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 14/549,803

(22) Filed: Nov. 21, 2014

(65) Prior Publication Data

US 2015/0143784 A1     May 28, 2015

Related U.S. Application Data

(63) Continuation of application No. PCT/US2013/044331, filed on Jun. 5, 2013.

(60) Provisional application No. 61/657,010, filed on Jun. 7, 2012.

(51) Int. Cl.
*A47L 5/36* (2006.01)
*B01D 45/16* (2006.01)
(Continued)

(52) U.S. Cl.
CPC .......... *B01D 45/16* (2013.01); *B01D 21/003* (2013.01); *B01D 45/04* (2013.01); *B01D 45/08* (2013.01);
(Continued)

(58) Field of Classification Search
CPC ...... B01D 45/16; B01D 21/003; B01D 45/04; B01D 45/08; B01D 45/12; B01D 50/002; B04C 3/06
See application file for complete search history.

(56) References Cited

U.S. PATENT DOCUMENTS 2,473,602 A * 6/1949 Loumiet Et Lavigne ................ B01D 45/16 55/338
2,610,697 A * 9/1952 Lovelady ............... B01D 45/02 210/512.1

(Continued)

FOREIGN PATENT DOCUMENTS

GB           2190608 A * 11/1987 ............... B04C 7/00

OTHER PUBLICATIONS

Korean Intellectual Property Office (KIPO), International Search Report and Written Opinion, PCT International Application No. PCT/US2013/044331, issued Aug. 22, 2013, pp. 1-10, with claims searched, pp. 11-14.

*Primary Examiner* — Dung H Bui
(74) *Attorney, Agent, or Firm* — O'Banion & Ritchey LLP; John P. O'Banion

(57) ABSTRACT

A form of crossflow filtration particle separator which receives a particle laden moving fluid surrounded by a clear moving fluid at a proximal end, and separates the particles into a collection zone, or collector, in response to vortices created by diagonal slits and baffles located from the center of the particle separator to its distal end. The filter operates horizontally in a small amount of space without use of physical filter media or the need of a high pressure flow, while allowing delicate particles to be separated without damage. Particle collection structures allow the separated particles to be carried away in a separate flow.

17 Claims, 10 Drawing Sheets

(51) Int. Cl.
   *B01D 45/08* (2006.01)
   *B01D 45/12* (2006.01)
   *B01D 50/00* (2006.01)
   *B01D 45/04* (2006.01)
   *B01D 21/00* (2006.01)
   *B04C 3/06* (2006.01)

(52) U.S. Cl.
   CPC ........... *B01D 45/12* (2013.01); *B01D 50/002* (2013.01); *B04C 3/06* (2013.01)

(56) References Cited

U.S. PATENT DOCUMENTS

| | | | | |
|---|---|---|---|---|
| 3,106,334 A * | 10/1963 | Fogleman | ............. | F25B 31/026 310/57 |
| 3,349,548 A * | 10/1967 | Boyen | ................... | B04C 5/103 210/512.1 |
| 3,399,770 A * | 9/1968 | Salomon | ................. | B04C 5/103 209/727 |
| 3,885,935 A * | 5/1975 | Nutter | ................... | B01D 45/12 55/424 |
| 4,375,386 A * | 3/1983 | Windham | ............. | B01D 1/305 159/31 |
| 4,832,710 A * | 5/1989 | Jury | ....................... | B01D 45/08 55/442 |
| 5,113,671 A * | 5/1992 | Westermeyer | .......... | F25B 43/02 55/337 |
| 5,120,335 A * | 6/1992 | Gorlich | .................. | B01D 46/16 55/429 |
| 5,553,460 A * | 9/1996 | Isaacs | .................... | B01D 45/16 62/129 |
| 6,214,305 B1 | 4/2001 | Van Harderveld et al. | | |
| 6,228,260 B1 | 5/2001 | Conrad et al. | | |
| 6,280,502 B1 | 8/2001 | Van Veen et al. | | |
| 2003/0145724 A1 | 8/2003 | Betting et al. | | |
| 2003/0150324 A1* | 8/2003 | West | .................. | B01D 17/0211 95/268 |
| 2004/0089600 A1 | 5/2004 | Haq et al. | | |
| 2006/0196658 A1* | 9/2006 | Belcher | ................ | B65G 53/521 166/244.1 |
| 2009/0084714 A1* | 4/2009 | Schook | ............. | B01D 19/0057 209/639 |
| 2009/0139192 A1* | 6/2009 | Sams | ..................... | B01D 45/12 55/418 |
| 2009/0139938 A1* | 6/2009 | Larnholm | ................. | B04C 3/00 210/788 |
| 2009/0282858 A1* | 11/2009 | Demetri | ................ | B01D 45/12 62/401 |
| 2009/0314161 A1* | 12/2009 | Al-Alusi | ............... | B01D 45/16 95/271 |
| 2014/0346118 A1* | 11/2014 | Folkvang | ........... | B01D 17/0205 210/712 |

* cited by examiner

CROSSFLOW FILTRATION PARTICLE SEPARATOR

CROSS-REFERENCE TO RELATED APPLICATIONS

This application is a 35 U.S.C. §111(a) continuation of PCT international application number PCT/US2013/044331 filed on Jun. 5, 2013, incorporated herein by reference in its entirety, which claims priority to, and the benefit of, U.S. provisional patent application Ser. No. 61/657,010 filed on Jun. 7, 2012, incorporated herein by reference in its entirety. Priority is claimed to each of the foregoing applications.

The above-referenced PCT international application was published as PCT International Publication No. WO 2013/184814 on Dec. 12, 2013, which publication is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED IN A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technical Field

This technology pertains generally to filtration, and more particularly to a form of crossflow filtration particle separator.

2. Description of Related Art

A wide range of applications exist for filtration systems. In particular particle separation filtration can be utilized for separating out, or alternatively collecting, particles from a moving fluid, which may be liquid or gaseous.

Conventional techniques for separating particles from a moving liquid, include centrifugal, sedimentary, or use of a screen mechanism, typically comprising a filter media. Each of these methods suffer from low efficiency and high energy consumption when target solids are small, have a density similar to the fluid, or are fragile.

Filtering of liquids and gases utilizing a filter screen or media (filter media mesh smaller than the particles being separated) impose a significant resistance to fluid flow which substantially increases as particulates collect on the filter which requires periodic cleaning or replacement.

Another form of filtering is that of cyclonic separation which does not require the use of filter media, but requires a high velocity fluid flow most typically applied to filtering of large particles from air. Cyclonic separation directs high velocity air through a helical manifold directed downward into a deep vertical tube while cleaner air is collected out the top of the large vertical unit. Large particles due to their mass are separated from the air in response to rotational inertia and gravity and fall down into the well of the vertical unit. Cyclones provide limited particle separation ability while requiring high velocity fluid flow (e.g., air flow between 10 and 20 meters per second), and are subject to significant pressure drops.

Accordingly, a need exists for particle separators which can be implemented without the problems associated with the use of physical filter media, or the need of high pressure flows.

BRIEF SUMMARY

A particle separator which operates with both liquid and gaseous fluids, and is capable of separating a large percentage of the particles contained therein from a low speed, low pressure, flow without the need of filter media. The filter design is based on a form of crossflow filtration developed using computational fluid dynamic (CFD) simulations inspired by a study of particle retention mechanisms by suspension-feeding fish.

In crossflow filtration, particle-laden fluid flows parallel to the filter surface instead of perpendicular to it, as found in dead-end filtration methods. The filtrate goes through the filtering structure, yet the particles remain suspended in the main flow, and are therefore concentrated as the flow moves along the filter surface.

The geometric structure of this inventive separator comprises a substantially horizontal cylindrical body (e.g., preferably with a smooth cross section, such as round or oval) with a number of slits and baffles and an opening through the bottom of the body nearer the distal end for collecting particles which are concentrated in this particle collection zone. Several external structures are optionally connected to the particle collection zone of the device for extracting particles from the device.

In this filtration device, concentration of incoming particles is performed in response to vortices created by a combination of fluid flowing through a series of baffles and then out through the sides of the device through a series of slits, and fluid flow patterns created from the closed end of the device. It will be noted that the particles being retained are substantially smaller than the slits in the device, whereby the slits do not operate as a filter mesh. The fluid containing the particles enter the cavity through the proximal end, while particle-free or low-particle concentration filtrate leaves the separator through lateral slits closer to the distal end. The result is a high-solids flow at a particle collection zone near the distal end of the device which can be collected.

The low flow velocity and low head loss (about 2 cm) allow gravity to be the only driving force to induce flow through the separator, which can minimize energy consumption and shear forces caused by mechanical pumping.

The device is particularly well suited for use in filtering liquid or gas containing fragile particles, low flow situations, low energy filtration, or combinations thereof. A series of these crossflow filtering devices can be coupled in series to increase the percentage of particles collected. The device can also be utilized in pre-filtering of a fluid to reduce particle concentrations, for example to reduce particles reaching a filter media. Alternatively, the device can be utilized for post treatment operations, such as installed after settling or other partial filtration processes that remove larger particles first. An example of use, includes treating a continuous water flow containing relatively small, fragile particles present at low concentrations with low energy consumption, such as in treatment of wastewater, algal cultures, or aquaculture in general. Examples of use in filtering a gas include agricultural filtering, such as removing various forms of 'dust' from an airstream.

Further aspects of the technology will be brought out in the following portions of the specification, wherein the detailed description is for the purpose of fully disclosing preferred embodiments of the technology described herein without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1A:
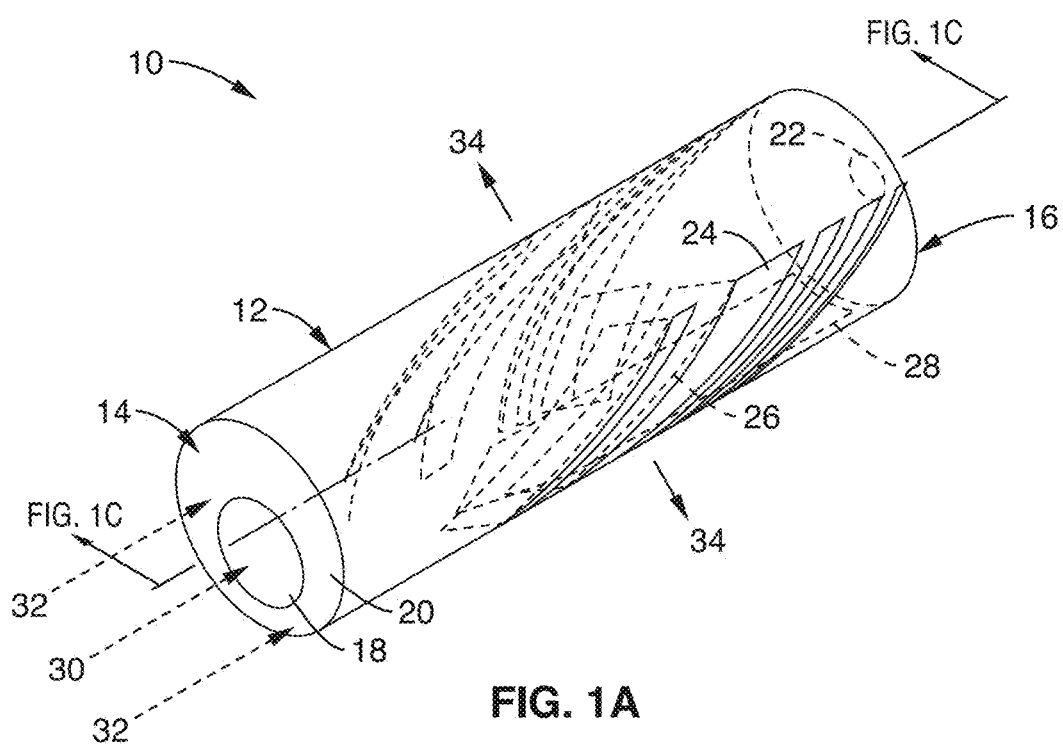
FIG. 1A through FIG. 1C are orthogonal, side and sectional views, respectively, of a crossflow filtration particle separator according to an embodiment of the technology described herein.
Figure 1B:
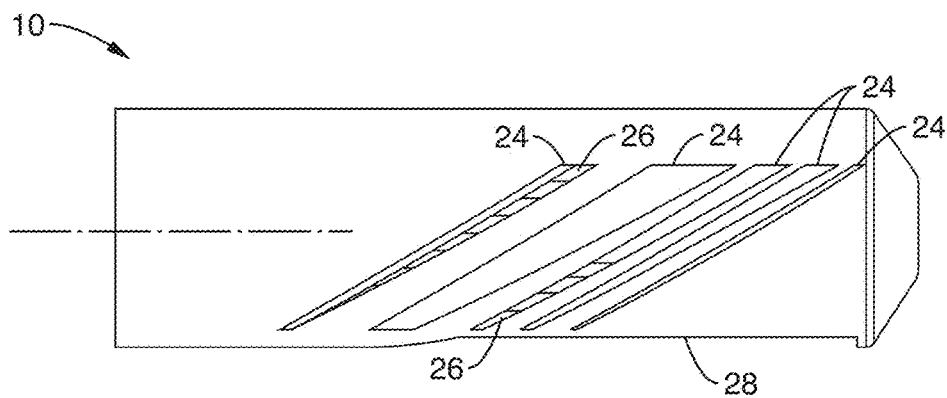
Figure 1C:
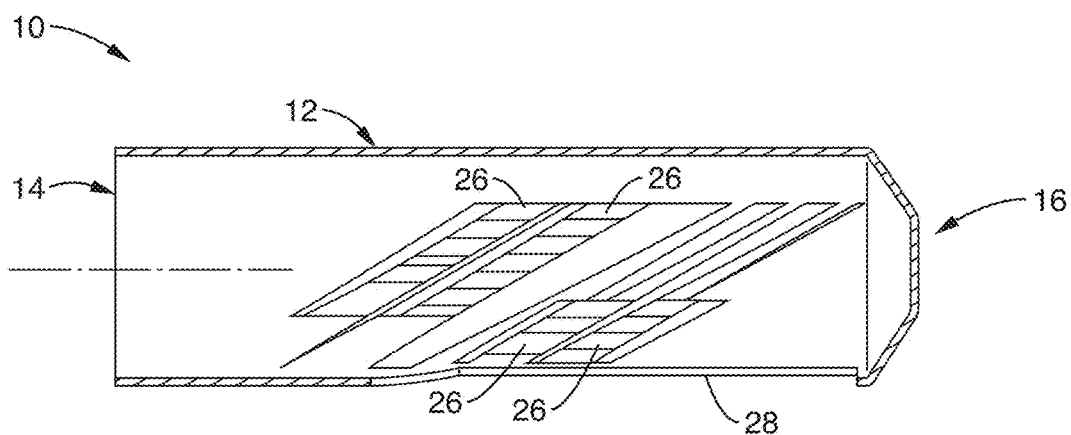

FIG. 1A through FIG. 1C illustrate an example embodiment 10 of the inventive particle separator for use on liquids, although a similar device can be utilized for separating particles from a gaseous flow. The geometric structure of the embodied separator consists of a cavity formed within a substantially horizontal cylindrical body 12 (e.g., approximately 2.5 cm diameter in this example) having a first end 14 (proximal end), and a second end 16 (distal end) covered by a conical cap 22. It should be appreciated that the body of the device need not be formed having an exact circular cross-section, and it may be oval or otherwise have a generally smooth contoured interior. The size of the device can be scaled up or down depending on the application without departing from the teachings of the technology described herein.

The first end (proximal end) receives a moving liquid fluid in two regions, a first region 18 (e.g., small circuit) for receiving particle laden liquid, and a second region 20 (e.g., annulus), at least substantially surrounding the first region, for receiving a liquid from which particles are not being collected, for example a clear liquid, or a liquid without significant particles. Particle-laden flow is introduced 30 through region 18, with clear liquid injected 32 through region 20. Particle-free fluid, or which has substantially decreased level of particles, exits 34 through slits 24 about periphery of the horizontal cylinder 12.

Disposed about the periphery of the cylinder, located centrally and toward the distal end, are several pairs of angled (diagonal) slits 24 with associated baffles 26. These slits 24 and baffles 26 are slanted, preferably at approximately 30 to 70°, with a preferred angle used on the trials as 30°. A smaller portion of each slit or baffle starting near the bottom of the structure and extending diagonally up the sides toward the top of the structure while increasing in width toward the distal end of the device. For the case with five slits, a preferred ratio of the widths of slits from the proximal end of the device to the distal end is approximately 3:8:3:3:1. Each baffle comprises a series of small projecting structures which for this example embodiment were formed as thin and plate-shaped. The width of the baffles in the example embodiment were about 1.2 cm with an angle toward the proximal end, and extend from the wall for about 0.6 cm. Several pairs of slits with baffles of different widths are located on both lateral sides of the cylindrical body of the device. The longest width of the slits for this particular embodiment is about 2 cm. The slits 24, baffles 26 and collection zone 28 can be most readily seen, respectively, in the side view of FIG. 1B and in the cross-section view of FIG. 1C.

A particle collection zone 28 is located at the bottom of horizontal cylinder 12 near the distal end. Gravity or a suction force is used to carry the concentrate out of the separator, such that there is no return flow from the collection zone to the separator cavity.

In operation, when the particles in the flow are moving close to the walls, they are affected by a hydrodynamic retardation enhanced by the baffles, resulting in a velocity that is different from what it is when the particles are moving far from the walls. A lift force is also induced in response to shear as fluid moves near the walls. These forces affect the momentum of the particles resulting in a change in particle trajectories, specifically directing them to the particle collection zone.

As particle-laden flow enters the separator, the first pair of slits plays an important role in triggering the rotation of the flow. The location, slanted direction, slanted angle of the slits, and back flow of the fluid returned from the close distal end of the device lead the flow to move downward and to generate vortices on the upper distal (posterodorsal) part of the separator. The vortices cause the suspended particles to move down to the bottom of the separator. In the particle collection zone, which is a long and wide strip at the bottom of the separator near the distal end, a small flow of liquid is induced in such a way that the fluid leaving the separator does not cause the particles to move back into the main flow.

The baffles nearest the inlet of the device act to create vortices on the sides of the separator which concentrate most of the particles in the main stream. The location of the baffles as well as the conical shape of the posterior end of the separator contributes to the formation of the vortices on the top of the separator and to the intensity of the vortices. The "shield flow" 32 prevents the particles in particle-laden flow 30 from exiting the separator through the slits and keeps them in the main stream until they reach the collection zone.

The back flow acts like another shield to retain the particles in the center of the device. In addition, the lower part of the "shield flow" plays a role in sweeping away the particles settled in front of the collection zone. The "shield flow" ensures that a large proportion of the particles stay in the separator until they have settled. Settling particles are preferably removed from the collection zone utilizing a collection port or more preferably a collection structure.

The amount of flow leaving through the collection structure or collection port for this embodiment is approximately 8%, although different configurations of the collection zone will change that value without departing from the teachings of the technology described herein. The device operated with collection outflows of from 2%-50% of the inflow amount.

Figure 2A:
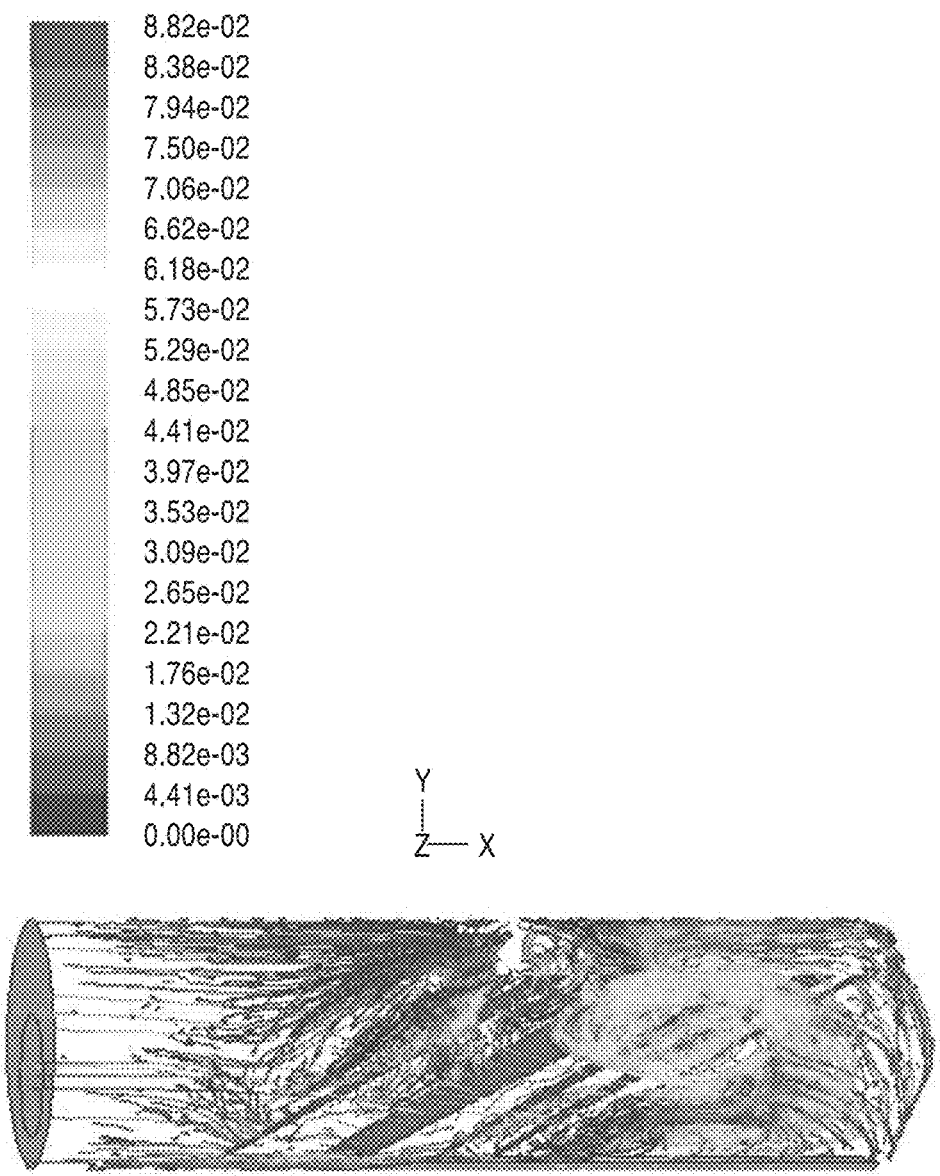
FIG. 2A and FIG. 2B are lateral and dorsal flow pattern views of the crossflow filtration particle separator of FIG. 1A through FIG. 1C.
Figure 2B:
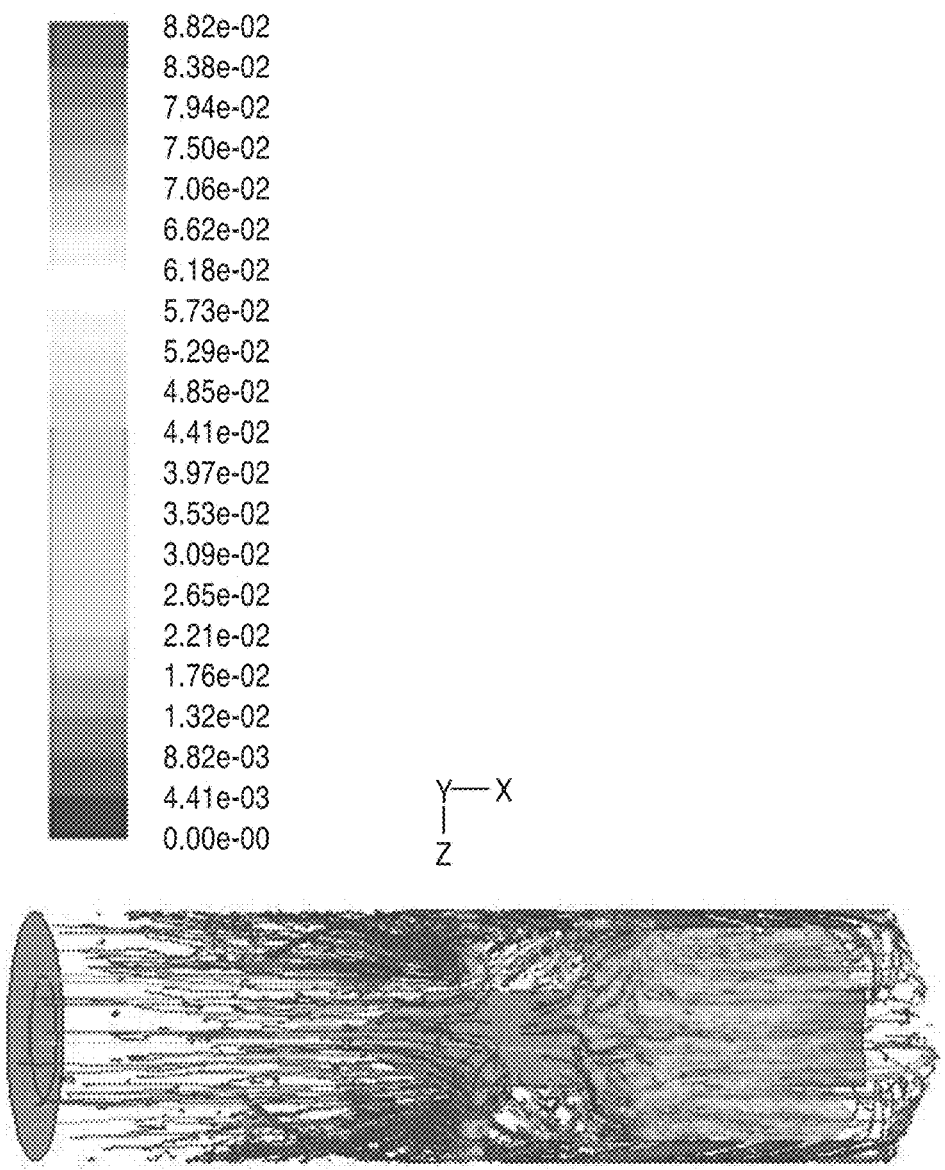

It should be appreciated that flow 30 entering through region 18 in FIG. 1A is the flow that is to be treated, which can be transported via a tube and released at the proximal end of the device. It will be noted in FIG. 1A that the center of this flow region 18 is below the centerline of the tubular housing 12, such as for example by 0.3 cm for the embodiment shown. FIG. 2A and FIG. 2B depict simulation results for the device shown in FIG. 1A through FIG. 1C, showing that the developed flow inside the separator forms a large vortex on the upper distal (posterodorsal) portion of the separator. This vortex forces the particles entering the separator to go downward towards the particle collection zone 28 directly. The clear flow 32 injected from the annulus cross-section 20 of the inlet acts as a shield flow between the particle-laden flow and the slits to prevent particles from exiting through the first few pairs of slits. In response to shield flow and vortices, 66% of the injected particles (specific gravity 1.04 and 707 µm in diameter) were removed using only 8% of the injected particle-laden liquid (water) flow. No significant difference on particle removal efficiency was found when scaling up the diameter of the cylindrical separator body from 2.5 cm to 25 cm. The ratio of diameter to length is preferably about 1:3.5, and remains the same when scaling up the device. Test results indicate improved device performance when particles are generally larger than 200 µm, but the effectiveness is dependent on particle size and specific gravity. The largest particles tested in a gaseous fluid were 1.4 mm, with the gaseous fluid being air.

Although CFD simulation is a powerful technique to predict fluid flow and particle movements, physical embodiments according to the technology described herein were prepared and tested to validate the simulations. The initial CFD models did not include a physical structure for particle collection in the particle collection zone, however, to enhance testing and practical removal of the collected particles, embodiments were built modeling three different particle collection mechanisms.

Figure 3A:
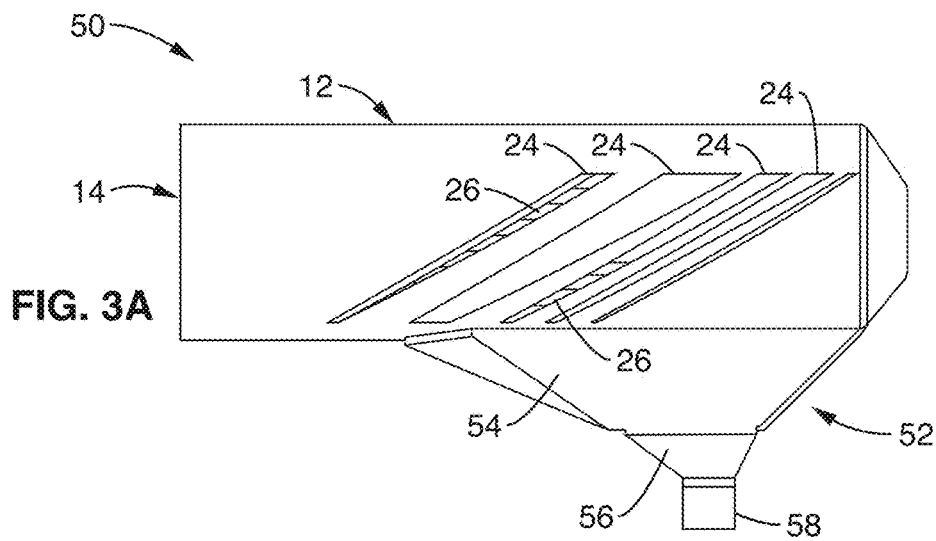
FIG. 3A through 3C are side views of three crossflow filtration particle separators according to an embodiment of the technology described herein, shown with external structures.
Figure 3B:
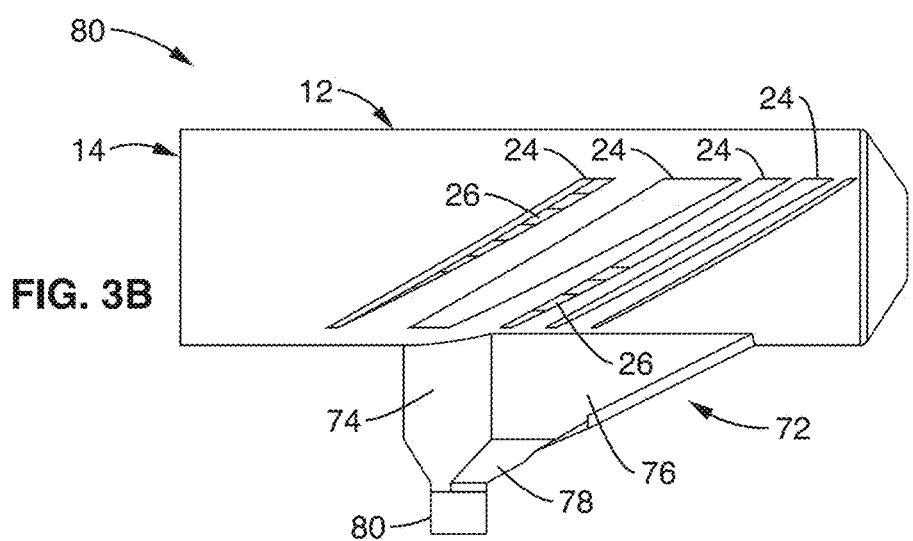
Figure 3C:
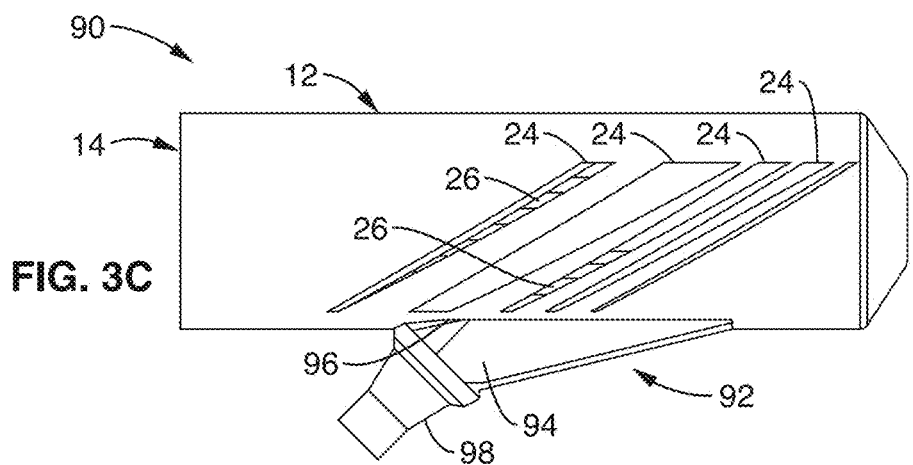

FIG. 3A through 3C illustrate example embodiments 50, 80 and 90 of crossflow filtration particle separators each having different external structures installed at their collection zone. It will be appreciated that the geometry of the collector structure at the collection zone can have a significant effect on the flow patterns inside the separator device and its associated particle removal efficiency. Both physical embodiments and simulations were utilized to assess performance of these different collection structures.

In each of these three structures of FIG. 3A through FIG. 3C, are seen the separator body 12 with inlet 14, slits 24 and baffles 26. In FIG. 3A the collection structure was designed to provide a large space that could be used to build a larger vortex or a more complete one, compared to the device with no external structure. In FIG. 3A the collector 52 is seen with an upper collection section 54 having a gentle sloping upper collection section, connected to a lower collection section 56 terminating in particle removal tube 58. In FIG. 3B the collection structure 72 was designed to allow the vortex to push the particles down vertically and take them out directly with the collection flow. It can be seen that a proximal side 74 of collector 72 is a wall that is substantially perpendicular to the orientation of housing 12, while the distal side of collector 12 has a gentle slope 76. This upper collector section is connected to a lower collection section 78 which terminates in particle removal tube 80. The design of the collector 92 in FIG. 3C is directed to having a device whose vortex is similar to the one generated in the device with no external structure. In FIG. 3C the collector is seen canted back toward the proximal end with a separator wall 96 toward the proximal end, and a low angle wall 94 toward the distal end of housing 12. This upper collector terminates in particle removal tube 98.

In testing physical embodiments, a fluid jacket was created using separate peristaltic pumps to transport clear water and the particle-laden flows with given flow rates. The flow rate of the effluent leaving through the collection tube was adjusted by the height of the exit. Analogous particles used to simulate possible target particles were injected into the system through a particle injection basin.

Two kinds of analogous particles were used in this study. One analogous particle was prepared from grinding a form of acrylonitrile butadiene styrene (ABS) beads (density of 1040 kg/m$^3$), in a mill and then collecting them with a wire mesh screen to harvest the chosen particle size, which is about 707 µm in this study. The other kind of analogous particles utilized were commercial polystyrene (PS) beads (density of 1050 kg/m$^3$) having particles of different size ranges, 600 µm, 355 to 425 µm, 200 to 300 µm, and 106 to 125 µm.

As the shape of particles can have significant effect on particle removal performance, a shape factor was included in the calculations. The shape factor is defined as the ratio of the surface area of a sphere to that of a non-spherical particle with the same volume. To estimate the shape factor of non-spherical particles image analysis software was utilized. For the simulations height was calculated based on the assumption that all particles have the same volume as a spherical particle with a diameter of 707 µm. The parameters obtained for the non-spherical particles are listed in Table 1.

Normally, particle removal efficiency is presented using the ratio of particles removed to the total amount of treated particles. However, in this study, the particles were removed in response to a certain amount of carrier flow. Therefore, in order to provide more complete information, the particle removal performance of the solid separator designed is represented by a clearance term:

$$\text{Clearance} = \left(\frac{\text{Particle ratio}}{\text{Flow ratio}}\right) \quad (1)$$

where the particle ratio is the percentage of particles obtained at the collection zone with respect to the particles in the influent, and the flow ratio is the percentage of water exiting through the collection port with respect to the influent particle-laden flow. Accordingly, clearance is the ratio of particle concentration in the flow obtained at the collection zone to that in the influent. If all the particles are assumed to be suspended and uniformly distributed during the whole separation process, the clearance should be one (i.e., the percentage of particles removed should be equal to the percentage of water flow entering the collection zone relative to the influent).

Aside from measuring particle removal efficiency, flow patterns in the particle separator during the separation processes were observed to determine the level of agreement with CFD simulations. Tests of the flow patterns were performed with the addition of tracer dyes that were injected into the system at the inlet circle of the particle-laden flow. The flow patterns of dye were identified and visual observations of the flows captured during the separation process for subsequent video processing.

Figure 4A:
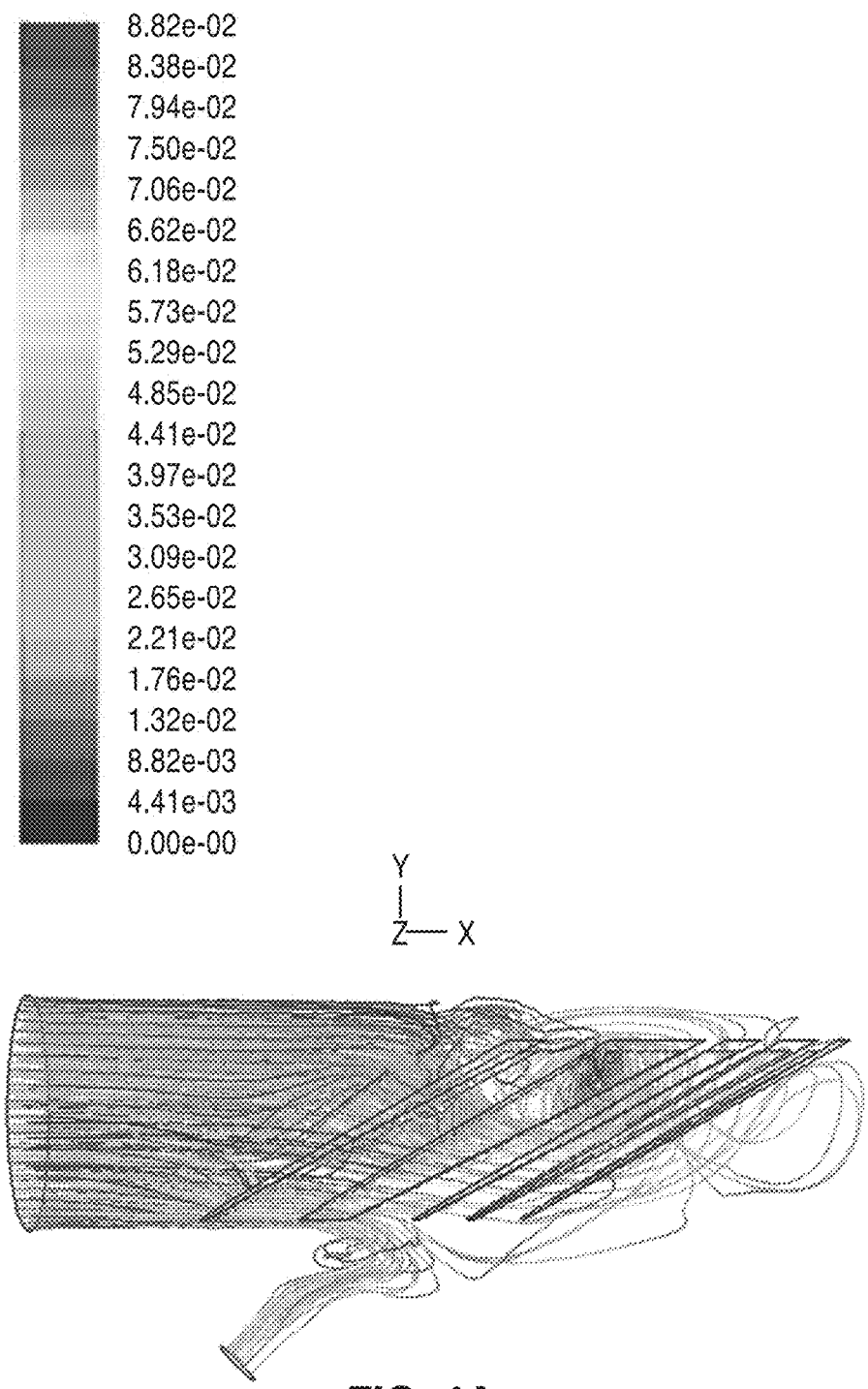
FIG. 4A and FIG. 4B are lateral and dorsal flow pattern views for the crossflow filtration particle separator of FIG. 3C.
Figure 4B:
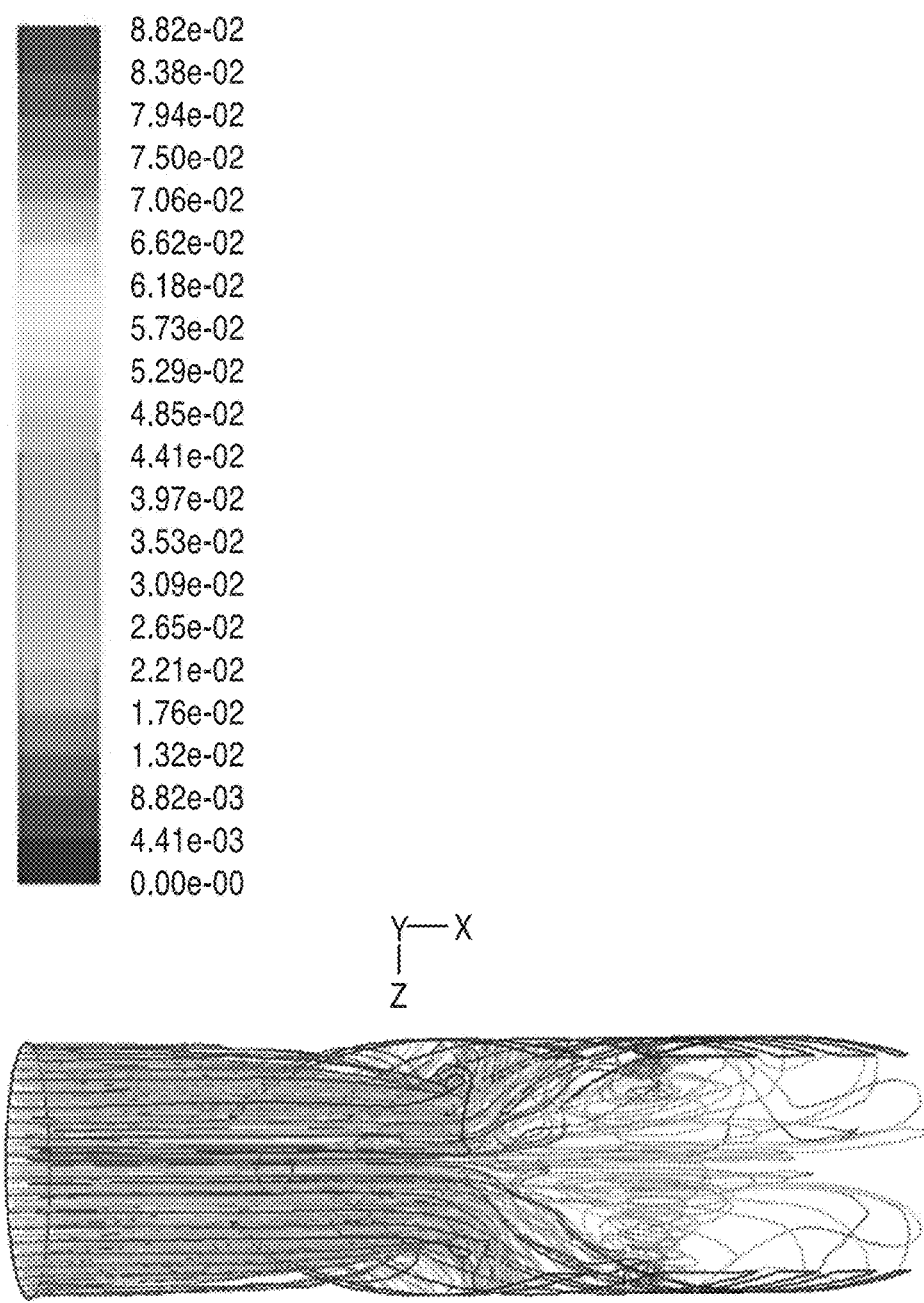

FIG. 4A and FIG. 4B depict simulated flow patterns inside the particle separator embodiment seen in FIG. 3C.

Figure 5A:
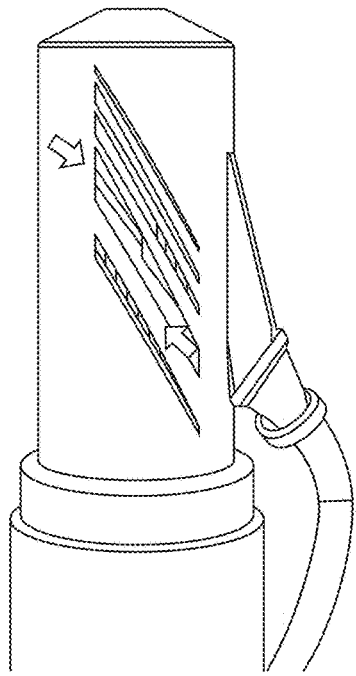
FIG. 5A through FIG. 5D are lateral images of flow for the crossflow filtration particle separator of FIG. 3C.
Figure 5B:
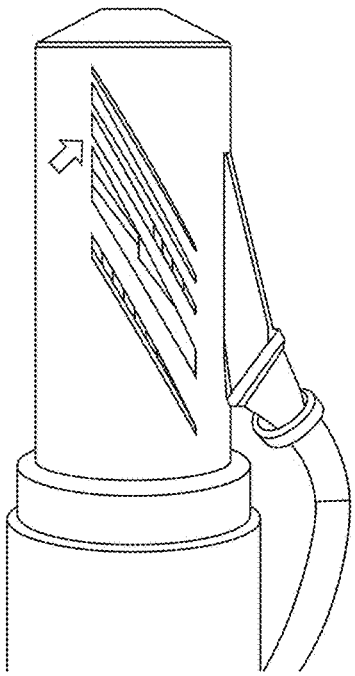
Figure 5C:
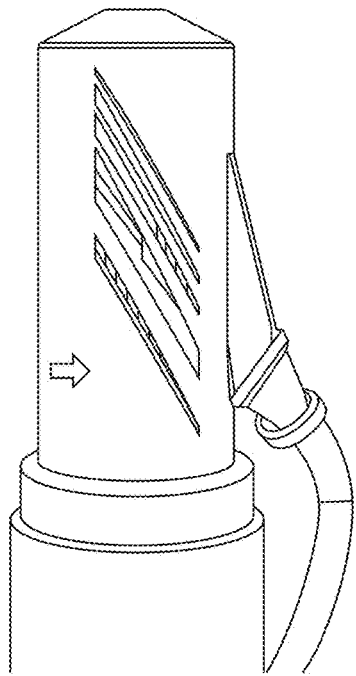
Figure 5D:
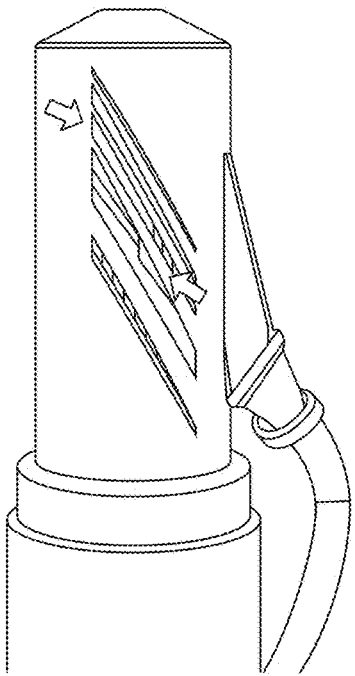

FIG. 5A through FIG. 5D show actual flow patterns of dye as an indicator in the flow. These views show that the flow that entered the prototype horizontally makes a sharp turn and moves downward, as indicated by the downward arrow in FIG. 5A, when the flow reached the first pair of slits. The size of vortices generated at the upper distal part of the prototype affects the angle of the flow curve. When a larger vortex was generated, it created a higher pressure and pushed the main flow downward with a larger angle. FIG. 5B and FIG. 5C illustrate the tops and bottoms of the vortex region, with FIG. 5D depicting the downward force on the particles created. In addition, although the vortices were not always the same size, they were observed to have a similar size to those obtained in simulations.

Meanwhile, the movement of a slug of food dye observed from the dorsal view verified that a back flow from the end of the prototype existed, in similar manner as was found in the simulations.

The particle trajectories inside the prototype of FIG. 3A were simulated using CFD and tested using the non-spherical analogous particles with a mean diameter of 707 µm. The simulation result shows that the addition of an external structure at the collection zone could change the flow patterns inside the prototype dramatically. This change in the case of FIG. 3C caused water flow opposite to the particle direction resulting in settling of particles on the bottom of the solid separator and on the ramp of the external structure. The experimental results verify the simulation results but also show that the flow backwashed some particles from the ramp of the external structure to the separator cavity. Many of the backwashed particles exited the separator through the lateral slits eventually. Therefore, the solid separator with this external structure of FIG. 3A was found to have low particle removal efficiency. Both spherical and non-spherical particles were used to test the particle removal performance of the prototypes.

Due to the significant effect of external structures on the flow patterns inside the solid separator, the prototype of FIG. 3B was found to induce similar flow patterns inside the separator body to those obtained from the simulated model with no external structure (FIG. 2A and FIG. 2B), and thus was chosen and studied in more detail.

The spherical particles with different nominal sizes, 600 µm, 355 to 425 µm, 200 to 300 µm, and 106 to 125 µm, were analyzed using the particle size analyzer, and the measured mean particle diameter for each nominal size (508 µm, 382 µm, 326 µm, and 126 µm) was utilized to run the simulations for particle removal efficiency for comparison with the experimental results. In addition, simulation results of the model with no external structure were compared with the experimental results.

The results from the experiments and the simulations of the models with and without external structures are listed in Table 2. Due to memory limitations of the computer used for running simulations, not all the particles left the system within the number of calculation steps used (50,000 steps). Some tests of random samples with extended calculation steps (about 20 times more steps) show that most of the particles remaining in the device did not leave the system even after the calculation steps were extended. Those particles are identified as "incomplete" by Fluent™. These "incomplete" particles might or might not leave the system through the collection tube in the experiment, and this uncertainty compromises the reliability of the comparison results. Therefore, the simulation results listed in Table 2 are calculated based on both the particles leaving the system within the calculation steps and on the sum of the particles leaving the system plus the "incomplete" ones.

Figure 6A:
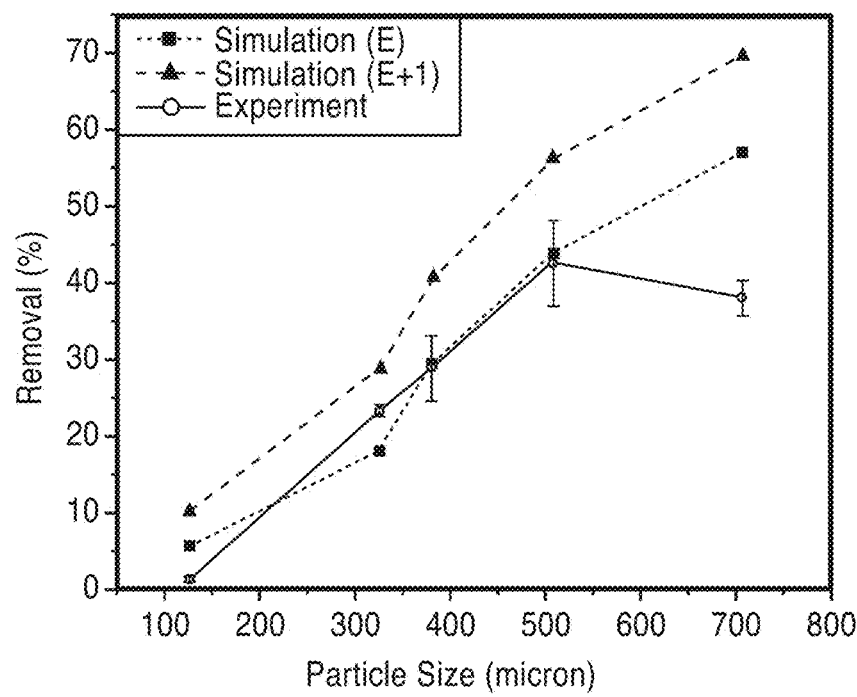
FIG. 6A and FIG. 6B are graphs of simulated particle removal performance performed without external structure (FIG. 6A) and with external structure (FIG. 6B).
Figure 6B:
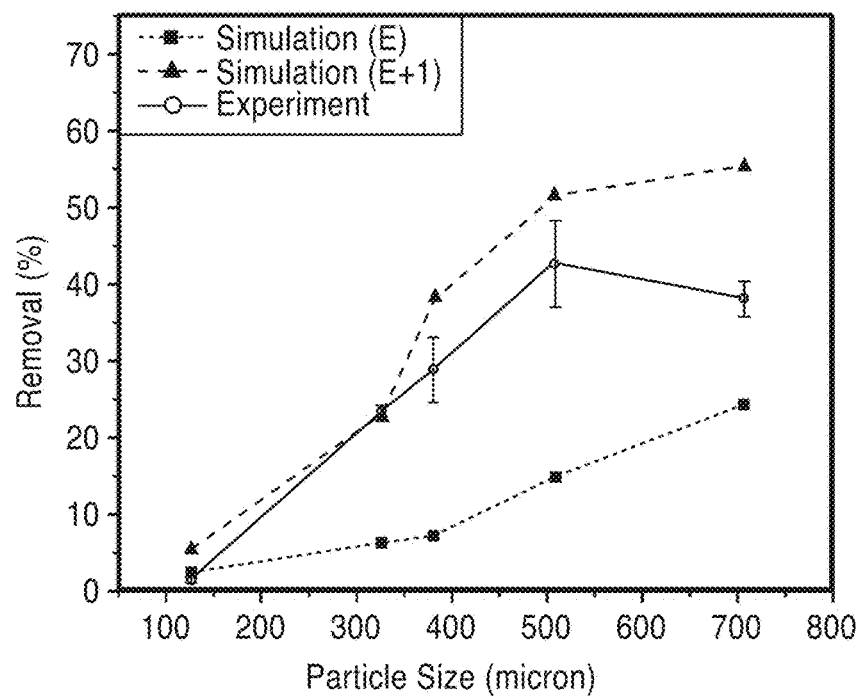

FIG. 6A and FIG. 6B present the above results graphically. Pearson's chi-squared tests were used to analyze all the statistical testing combinations including spherical particles and non-spherical particles in relation to particles leaving the system and the sum of the particles that leave the system and the "incomplete" ones. The results show that there was no significant difference between simulation and experimental results for the combination of spherical particles and the sum of particles leaving the system only for the simulation model without an external structure as seen in Table 3.

Figure 7A:
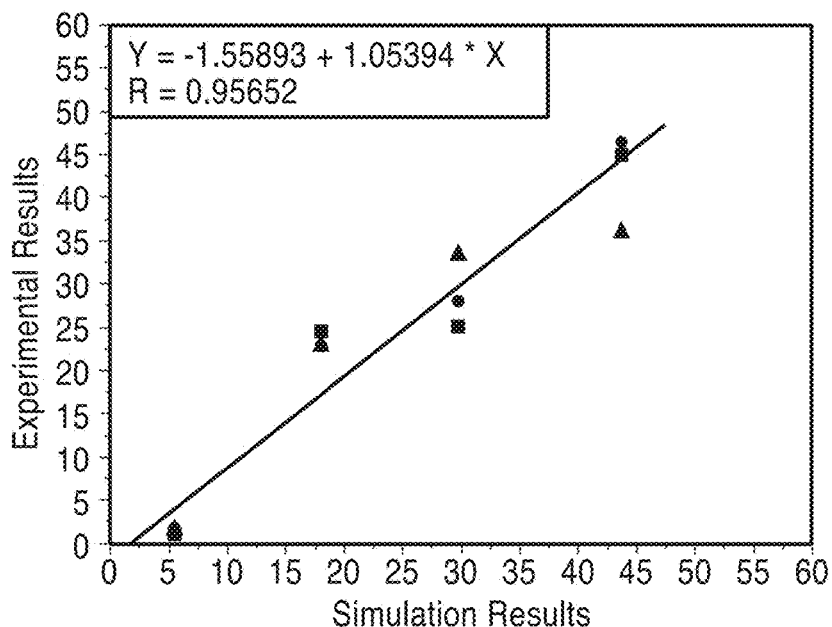
FIG. 7A and FIG. 7B are graphs of statistical analysis of the particle removal performance shown in FIG. 6A and FIG. 6B.
Figure 7B:
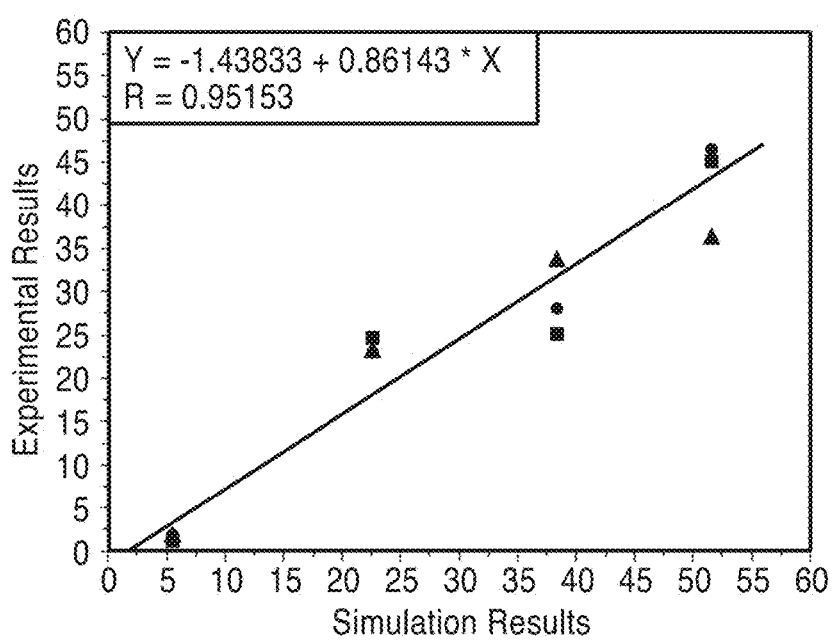

FIG. 7A and FIG. 7B depict a statistical analysis of particle removal performance for the graphs of FIG. 6A and FIG. 6B. The correlation coefficient R, seen in FIG. 7A, shows that the experimental results with spherical particles fit the simulation results with the particles leaving the system only. In contrast to the spherical particles, the tests with non-spherical particles show that particle removal efficiency obtained from the experiment was much lower than the simulation results as seen in FIG. 6A.

For the model with external structure shown in FIG. 3B, no significant difference was found between simulation and experimental results for the combination of spherical particles and the sum of the particles that left the system and the "incomplete" ones, seen in Table 3. Unlike the simulation model without any external structure, the experimental results were in closer agreement with the simulation results incorporating "incomplete" particles as seen in FIG. 6B. In addition, the test with non-spherical particles resulted in lower particle removal efficiency than the simulation results.

The CFD simulation results of the crossflow filtration particle separator show that high particle removal efficiency is obtainable with the model shown in FIG. 1. Although models with particle collection comprising an aperture through the bottom are difficult to implement in practice, which leads to the addition of external structures. The CFD simulations of the prototypes with external structures illustrate that the installation of external structures can change the flow patterns dramatically and may result in significantly different particle removal performances. Therefore, at least one embodiment was described with an external structure that generates flow patterns similar to those of the model and similar particle removal efficiency.

In using food dye movements to test prototypes, it was found that vortices were induced when the flow reached the first pair of slits and the magnitude of the flow deflection was determined by the size of the vortices generated at the upper distal part of the separator. It was seen from dorsal views that a large back flow from the end of the prototype to the second pair of slits was induced. In addition, the particles settled on the bottom of the solid separator and on the ramp of the external structure as predicted in the simulation. These tests examined the level of agreement between simulation and experimental results. The results show that the flow patterns induced inside the physical models and the corresponding particle trajectories are similar to those obtained from CFD simulations.

The particle removal performance of the CFD models also shows good agreement with the experimental ones. Although the experimental tests using non-spherical particles have lower particle removal efficiency than simulation results, the statistical analysis shows that for the spherical particles, there is no significant difference between the simulation and experimental results for the case without an external structure.

The low particle removal efficiency obtained by using non-spherical particles indicates that the estimated particle shape factor might not be an appropriate way to represent the actual shape of the tested particles. Therefore, a possible shape factor of those particles has been calculated based on the experimental result, with a clearance of 4.65, as seen in Table 2. The calculated shape factor is 0.2353, which is much smaller than 0.7115, the shape factor used for the simulation. The assumptions made and simplified methods used for the estimation of shape factor might cause the difference.

Three prototypes were tested with different external particle collection structures to validate operation of the cross-flow filtration particle separator. The flow patterns were observed by the addition of food dye to the flow while various types of particles were used to study the particle removal efficiency. The flow patterns and particle removal performance obtained from the tests indicate a substantial agreement between the simulation and the experimental results. Pearson's chi-squared tests show that for the spherical particles, there is no significant difference between the simulation and experimental results for the case without an external structure and the sum of the particles that leave the system only as well as the case with an external structure and the sum of the particles that leave the system and the "incomplete" ones. The fitness tests also show that the experimental results fit well with the simulated results.

From the discussion above it will be appreciated that the technology described herein can be embodied in various ways, including the following:

1. An apparatus for separating particles from a fluid, comprising: a housing having a substantially horizontal tubular cavity with a closed distal end, with a proximal end configured for receiving a first flow of fluid containing particles to be separated and a second flow of fluid surrounding said first flow; a plurality of adjacent slits and baffles are positioned diagonally along the sides of the housing located from the center of the particle separator to its distal end; and a particle collector positioned at the bottom of said housing; wherein said second flow shields particles from said first flow from exiting said slits; wherein particles collect from the first flow at said particle collector in response to vortices created by a combination of fluid flow striking the baffles and passing through said diagonal slits, and fluid motion on the closed distal end.

2. The apparatus of any preceding embodiment, wherein said diagonal slits and baffles are slanted at an angle from the orientation of said housing between 30° to 70°.

3. The apparatus of any preceding embodiment, wherein each of said baffles comprises a series of small projecting structures extending into an interior of said housing.

4. The apparatus of any preceding embodiment, wherein said apparatus operates without physical filter media, or need of a high pressure flow of said first flow or said second flow.

5. The apparatus of any preceding embodiment, wherein said apparatus can separate delicate particles from said first flow without damage the delicate particles.

6. The apparatus of any preceding embodiment, further comprising a fluid connection on said particle collector, wherein particles are collected and taken away in a third flow having a flow rate which is less than either said first flow or said second flow.

7. The apparatus of any preceding embodiment, wherein said particle collector is shaped with a rapid vertical drop to a fluid connection distal of the first slits, and a more gently sloped vertical drop to this fluid connection from near the distal end of the housing.

8. The apparatus of any preceding embodiment, wherein said housing is approximately cylindrical.

9. The apparatus of any preceding embodiment, wherein the diameter of said housing is between approximately 2.5 cm and 25 cm.

10. The apparatus of any preceding embodiment, wherein the diameter of particles to be removed is dependent on particle specific gravity as well as particle size.

11. The apparatus of any preceding embodiment, wherein said fluid comprises a liquid; and wherein diameter of particles to be removed from the liquid fluid is between 1 µm to 1.5 mm, and more particularly greater than 200 µm for particles with a specific gravity of approximately one.

12. The apparatus of any preceding embodiment: wherein said fluid comprises a gaseous fluid; and wherein particle removal performance depends on particle specific gravity; wherein diameter of particles to be removed from air, as said gaseous fluid, is on the order of 2 mm.

13. The apparatus of any preceding embodiment, wherein a multiple of said apparatus are utilized, coupled in series, to remove larger percentage of the particles from said first flow of fluid.

14. The apparatus of any preceding embodiment, wherein at least one of said apparatus is coupled into a system as a profiler, to reduce the amount of particles entering other filtering devices.

15. The apparatus of any preceding embodiment, wherein said apparatus is utilized in treatment of wastewater, algal cultures, or other aquacultures.

16. The apparatus of any preceding embodiment, wherein said apparatus is utilized in removing of fragile particles from a flow of liquid, without damage to the particles.

17. The apparatus of any preceding embodiment, wherein said apparatus is utilized in removing fragile particles selected from a group of particles consisting of flocks and algae.

18. An apparatus for separating particles from a fluid, comprising: a housing having a closed distal end, with a proximal end configured for receiving a first flow of fluid containing particles to be separated and a second flow of fluid surrounding said first flow; a plurality of adjacent slits and baffles are positioned diagonally along the sides of the housing located from center of said housing to its distal end; and a particle collector positioned at a bottom of said housing having a fluid connection through which particles are collected and taken away in a third flow having a flow rate which is less than either said first flow or said second flow; wherein said second flow shields particles from said first flow from exiting said slits; wherein particles collect from the first flow at said particle collector in response to vortices created by a combination of fluid flow striking the baffles and passing through said diagonal slits, and fluid motion on the closed distal end.

19. An apparatus for separating particles from a fluid, comprising: a tubular structure with a closed distal end; said tubular structure forms a cavity and is configured for receiving fluid flow at a proximal end; a plurality of lateral baffles and slits positioned diagonally along walls of said tubular structure, with said slits having a width exceeding the particle diameter; a particle collector disposed at the bottom of said tubular structure; wherein said fluid flow comprises a first fluid flow containing particles and a second fluid flow which annularly surrounds said first fluid flow; wherein a particle-free or low-particle concentration filtrate of said first fluid flow and second fluid flow exits the tubular structure through said lateral slits; wherein the particles from said first fluid flow are concentrated at the particle collector in response to vortices generated in response to fluid flow interacting with the baffles, slits and closed distal end.

20. The apparatus of any preceding embodiment, wherein said apparatus operates without physical filter media, or need of a high pressure flow of said first flow or said second flow.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Parameters of the Non-Spherical Particles

| | |
|---|---|
| Area (mm$^2$) | 0.467 ± 0.177 |
| Perimeter (mm) | 2.995 ± 0.619 |
| Shape Factor | 0.7115 ± 0.0448 |

All parameter data are represented by mean ± S.D.

TABLE 2

Comparison of Particle Removal Efficiency of Two Simulation Models and a Physical Model (FIG. 3B)

| Diameter | Sims: No External Structure | | Sims: with External Structure | |
|---|---|---|---|---|
| (μm) | E$^a$ | E + I | E | E + I |
| 126 | 5.47% (0.67) | 10.16% (1.24) | 2.34% (0.29) | 5.47% (0.67) |
| 326 | 17.97% (2.20) | 28.91% (3.53) | 6.25% (0.76) | 22.66% (2.77) |
| 382 | 26.69% (3.63) | 40.63% (4.97) | 7.03% (0.86) | 38.28% (4.68) |
| 508 | 43.75% (5.35) | 56.25% (6.88) | 14.84% (1.81) | 51.56% (6.30) |
| 707$^c$ | 57.03% (6.97) | 69.53% (8.50) | 24.22% (2.96) | 55.47% (6.78) |

| Diameter (μm) | Experimental Results | Recovery |
|---|---|---|
| 126 | 1.3 ± 0.3 (0.16) | 97.8% |
| 326 | 23.4 ± 1.0 (2.86) | 99.1% |
| 382 | 28.9 ± 4.2 (3.53) | 99.7% |
| 508 | 42.6 ± 5.6 (5.21) | 99.8% |
| 707$^c$ | 38.1 ± 2.4 (4.65) | 97.4% |

All data presented by particle removal % (clearance). Experimental data represented by mean ± S.D.% (clearance).
$^a$E indicates the particles collected at the collection zone in the simulation.
b—I indicates the particles stayed in the model after being calculated for 50000 steps.
$^c$The particles with a diameter of 707 are not spherical, simulation uses 0.7115 as shape factor for calculation.
d—Recovery indicates percentage of particles recovered at end of experiment (i.e., 99% Recovery indicates 1% of particles are lost during the operation process).

TABLE 3

P Values Obtained from Pearson's Chi-squared Tests for Difference Between each Simulation Model and Physical Model

| No. | Particle Movement | Particle Shape | No External Structure | with External Structure |
|---|---|---|---|---|
| 1 | E$^a$ + I | spherical | 0.0024 | 0.0727 |
| 2 | E + I | spherical + non-spherical | <0.001 | 0.0175 |
| 3 | E | spherical | 0.1828 | <0.001 |
| 4 | E | spherical + non-spherical | 0.0317 | <0.001 |

P value larger than 0.05 indicates there is no significant difference between means of simulation and experimental results.
$^a$E indicates the particles collected at the collection zone in the simulation.
b—I indicates the particles stayed in the model after being calculated for 50000 steps.

What is claimed is:

1. An apparatus for separating particles from a fluid, the apparatus comprising:
a housing having a substantially horizontal tubular cavity with a closed distal end, with a proximal end configured for receiving a first flow of fluid containing particles to be separated and a second flow of fluid surrounding said first flow;
a plurality of adjacent slits and baffles are positioned diagonally along the sides of the housing located from the center of the particle separator to its distal end;
wherein each of said plurality of slits is slanted and has an adjacent baffle comprising a series of structures projecting from said housing;
wherein each of said baffles comprise a series of small projecting structures extending into an interior of said housing;
a particle collector positioned at the bottom of said housing;
wherein said first flow of fluid containing particles to be separated is directed through said plurality of baffles and then out through the sides of said housing through said plurality of slits and away from said particular collector; and
wherein said second flow shields particles from said first flow from exiting said plurality of slits;
wherein said apparatus operates without physical filter media, or need of a high pressure flow of said first flow or said second flow;

wherein particles collect from the first flow at said particle collector in response to vortices created by a combination of fluid flow striking the baffles and passing through said diagonal slits, and fluid motion on the closed distal end.

2. The apparatus recited in claim 1, wherein said diagonal slits and baffles are slanted at an angle from said housing between 30° to 70°.

3. The apparatus recited in claim 1, wherein said apparatus can separate delicate particles from said first flow without damage to the delicate particles.

4. The apparatus recited in claim 1, further comprising a fluid connection on said particle collector, wherein particles are collected and taken away in a third flow having a flow rate which is less than either said first flow or said second flow.

5. The apparatus recited in claim 4, wherein said particle collector is shaped with a rapid vertical drop to a fluid connection distal of the first slits, and a more gently sloped vertical drop to this fluid connection from near the distal end of the housing.

6. The apparatus recited in claim 1, wherein said housing is approximately cylindrical.

7. The apparatus recited in claim 1, wherein the diameter of said housing is between approximately 2.5 cm and 25 cm.

8. The apparatus recited in claim 1, wherein the diameter of particles to be removed is dependent on particle specific gravity as well as particle size.

9. The apparatus recited in claim 1:

wherein said fluid comprises a liquid; and wherein diameter of particles to be removed from the liquid fluid is between 1 μm to 1.5 mm, and more particularly greater than 200 μm for particles with a specific gravity of approximately one.

10. The apparatus recited in claim 1:

wherein said fluid comprises a gaseous fluid;

wherein particle removal performance depends on particle specific gravity; and wherein diameter of particles to be removed from air, as said gaseous fluid, is on the order of 2 mm.

11. The apparatus recited in claim 1, wherein a multiple of said apparatus are utilized, coupled in series, to remove larger percentage of the particles from said first flow of fluid.

12. The apparatus recited in claim 1, wherein at least one of said apparatus is coupled into a system as a prefilter, to reduce the amount of particles entering other filtering devices.

13. The apparatus recited in claim 1, wherein said apparatus is utilized in treatment of wastewater, algal cultures, or other aquacultures.

14. The apparatus recited in claim 1, wherein said apparatus is utilized in removing of fragile particles from a flow of liquid, without damage to the particles.

15. The apparatus recited in claim 14, wherein said apparatus is utilized in removing fragile particles selected from a group of particles consisting of flocks and algae.

16. An apparatus for separating particles from a fluid, the apparatus comprising:

a housing having a closed distal end, with a proximal end configured for receiving a first flow of fluid containing particles to be separated and a second flow of fluid surrounding said first flow;

a plurality of adjacent slits and baffles that are positioned diagonally along the sides of the housing located from center of said housing to its distal end; and wherein each of said slits is slanted and has an adjacent baffle comprising a series of structures projecting from said housing;

wherein each of said baffles comprise a series of small projecting structures extending into an interior of said housing;

wherein said first flow of fluid containing particles to be separated is directed through each of said baffles and then out through sides of said housing through said plurality of slits; and a particle collector positioned at a bottom of said housing having a fluid connection through which particles are collected and taken away in a third flow having a flow rate which is less than either said first flow or said second flow;

wherein said second flow shields particles from said first flow from exiting said slits;

wherein said apparatus operates without physical filter media, or need of a high pressure flow of said first flow or said second flow; and wherein particles collect from the first flow at said particle collector in response to vortices created by a combination of fluid flow striking the baffles and passing through said diagonal slits, and fluid motion on the closed distal end.

17. An apparatus for separating particles from a fluid, comprising:

a tubular structure with a closed distal end;

said tubular structure forms a cavity and is configured for receiving fluid flow at a proximal end;

a plurality of lateral baffles and slits positioned diagonally along walls of said tubular structure, with said slits having a width exceeding the particle diameter; and wherein each of said slits is slanted and has an adjacent lateral baffle comprising a series of structures projecting from said tubular structure;

wherein each of said baffles comprise a series of small projecting structures extending into an interior of said tubular structure;

wherein said first flow of fluid containing particles to be separated is directed through each of said baffles and then out through sides of said tubular structure through said plurality of slits; and a particle collector disposed at the bottom of said tubular structure;

wherein said fluid flow comprises a first fluid flow containing particles and a second fluid flow which annularly surrounds said first fluid flow;

wherein a particle-free or low-particle concentration filtrate of said first fluid flow and second fluid flow exits the tubular structure through said lateral slits;

wherein said apparatus operates without physical filter media, or need of a high pressure flow of said first flow or said second flow; and wherein the particles from said first fluid flow are concentrated at the particle collector in response to vortices generated in response to fluid flow interacting with the baffles, slits and closed distal end.

* * * * *